(12) United States Patent
Shinkai et al.

(10) Patent No.: US 6,817,513 B2
(45) Date of Patent: Nov. 16, 2004

(54) ADHESIVE COMPOSITION FOR BONDING DIFFERENT MEMBERS, BONDING METHOD USING THE COMPOSITION AND COMPOSITE MEMBERS BONDED BY THE BONDING METHOD

(75) Inventors: Masayuki Shinkai, Ama-Gun (JP); Masahiro Kida, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 66 days.

(21) Appl. No.: 10/385,727

(22) Filed: Mar. 11, 2003

(65) Prior Publication Data

US 2003/0168496 A1 Sep. 11, 2003

Related U.S. Application Data

(62) Division of application No. 10/178,624, filed on Jun. 24, 2002, now Pat. No. 6,565,621, which is a division of application No. 09/689,129, filed on Oct. 12, 2000, now Pat. No. 6,440,578.

(30) Foreign Application Priority Data

Oct. 21, 1999 (JP) .......................................... 11-300184

(51) Int. Cl.⁷ .............................................. B23K 31/00
(52) U.S. Cl. .................................. 228/248.1; 228/122.1
(58) Field of Search .......................... 228/248.1, 248.5, 228/122.1, 121, 245, 256, 254; 148/24

(56) References Cited

U.S. PATENT DOCUMENTS

| 4,485,150 A | | 11/1984 | Tsuno |
| 4,715,892 A | * | 12/1987 | Mahulikar .................... 75/233 |
| 4,729,504 A | * | 3/1988 | Edamura ................. 228/122.1 |
| 4,749,594 A | * | 6/1988 | Malikowski et al. ....... 427/190 |
| 4,932,582 A | | 6/1990 | Une |
| 5,965,197 A | | 10/1999 | Jin et al. |
| 6,348,273 B1 | | 2/2002 | Ishikawa et al. |
| 6,390,354 B1 | | 5/2002 | Makino et al. |
| 6,440,578 B1 | * | 8/2002 | Shinkai et al. .............. 428/548 |
| 6,485,816 B2 | | 11/2002 | Araki et al. |
| 6,565,621 B2 | * | 5/2003 | Shinkai et al. ................ 75/252 |
| 6,742,700 B2 | * | 6/2004 | Makino et al. ............. 228/188 |
| 2001/0031345 A1 | * | 10/2001 | Araki et al. ................ 428/209 |
| 2002/0092896 A1 | * | 7/2002 | Makino et al. ............. 228/245 |
| 2002/0125300 A1 | * | 9/2002 | Ishikawa et al. ......... 228/122.1 |
| 2003/0030141 A1 | * | 2/2003 | Araki et al. ................ 257/720 |
| 2003/0035975 A1 | * | 2/2003 | Shinkai et al. ............. 428/554 |
| 2003/0168496 A1 | * | 9/2003 | Shinkai et al. ......... 228/180.21 |

FOREIGN PATENT DOCUMENTS

| EP | 0 612 577 | 8/1994 |
| EP | 0 937 536 | 8/1999 |
| EP | 1122780 A2 * | 8/2001 |
| GB | 1 590 695 | 6/1981 |
| GB | 2 108 534 | 5/1983 |
| JP | 01028333 | 1/1989 |
| JP | 6-126479 | 5/1994 |

* cited by examiner

*Primary Examiner*—Kiley Stoner
(74) *Attorney, Agent, or Firm*—Burr & Brown

(57) ABSTRACT

An adhesive composition is provided for bonding two or more different members which can give a bonded material having excellent heat resistance characteristics while inhibiting breakage of the materials to be bonded by reducing the expansion coefficient, the Young's modulus and the proof stress value. A method for bonding two or more different members using the adhesive composition, and a composite member comprising two or more different members bonded by the above method can be provided by the adhesive composition which comprises a hard solder and a mixture of at least two fine particle materials differing in wettability with the hard solder and which is controlled in expansion coefficient, Young's modulus and proof stress value.

18 Claims, 3 Drawing Sheets

ADHESIVE COMPOSITION FOR BONDING DIFFERENT MEMBERS, BONDING METHOD USING THE COMPOSITION AND COMPOSITE MEMBERS BONDED BY THE BONDING METHOD

CROSS REFERENCE TO RELATED APPLICATIONS

This application is division of U.S. application Ser. No. 10/178,624, filed Jun. 24, 2002, now U.S. Pat. No. 6,565,621, which in turn is a division of U.S. application Ser. No. 09/689,129, filed Oct. 12, 2000, now U.S. Pat. No. 6,440,578, the entireties of which are incorporated herein by reference.

BACKGROUND OF THE INVENTION

The present invention relates to an adhesive composition for bonding two or more different members through a fitting structure, a bonding method using the composition, and a composite member made by the bonding method. More particularly, it relates to an adhesive composition for making a composite member comprising two or more different members bonded through a fitting structure which is controlled in its expansion coefficient and residual stress, a method for bonding two or more different members using the composition, and a composite member made by the bonding method.

There is a method of using a solder for bonding different members, for example, a ceramic member and a metallic member. However, during cooling operation after bonding them at high temperatures, thermal stress is generated due to the difference in thermal expansion coefficients between the different members or between the member and the solder used for bonding of these different members to cause separation at the bonded interface. If one of the members is fragile, cracks occur in the vicinity of the bonded interface and sometimes the desired bonding strength or airtightness cannot be obtained. The products in which these defects are caused during the production steps must be disposed of as rejected products, and this results in an increase of the production cost for these composite members. Moreover, if they are subjected to thermal cycles in use, the defects occur after use for a certain period to cause deterioration of reliability of the products.

When different members are bonded using a solder, a method is generally employed according to which the surface of the ceramic member to be bonded is plated with a metal such as Ni to ensure wetting between the ceramic member and the solder. Then these members are disposed opposite to each other with a suitable space, the solder is poured into the space, and the members are bonded. There is another method according to which an additive such as Ti, which can ensure wetting by forming a reactive layer of a nitride or an oxide on the surface of the ceramic member, is added to the solder, without carrying out the plating with a metal. However, these methods are not preferred because they are not enough to reduce the thermal stress, and cracks are often formed on the side of the ceramic member which is fragile against thermal stress or separation is caused at the bonded part to adversely affect various performances such as bonding strength and airtightness required for composite member.

As methods for relaxing the thermal stress, a method of using a metal low in thermal expansion coefficient as an intermediate material at the time of bonding and a method of using as an intermediate material a soft metal which is high in reactivity with ceramics and can relax the stress by plastic deformation are generally employed. However, these techniques also suffer from the problems caused by difference in thermal expansion between the solder and the member, for example, low thermal cycle characteristics, and cannot necessarily be said to be high in general-purpose properties. Furthermore, there is a high-pressure solid phase bonding method which is now under development, but this method has unsolved problems for practical utilization and cannot provide a sufficient bonding strength.

On the other hand, as a composite solder, JP-A-6-126479 discloses a mixture of powders comprising materials having a higher melting point than the solder used for bonding a semiconductor chip and a substrate. However, this aims to solve the problem of insufficient wetting of the conventional composite solder caused by the powder also present on the surface by filling a powder comprising materials higher in melting point than the solder only in the central portion of the solder per se. In other words, this aims to increase the bonding strength at the bonded interface. This composite solder is not effective for decreasing thermal stress, and, hence, is not effective in solving the problems caused by the thermal stress between the members to be bonded or between the member and the solder.

As a result of intensive research conducted by the inventors for attaining the above object, they have found an adhesive composition for bonding at least two different members which does not cause decrease of bonding strength in the vicinity of the bonded interface due to thermal stress generated during cooling operation after bonding at high temperatures and does not cause generation of cracks in the member weak against the thermal stress during the cooling operation while maintaining an appropriate bonding strength between the different members. A Japanese Patent Application No. 10-52971 was filed on this subject.

That is, as a result of intensive research, the inventors have found that at least two different members can be bonded without causing a decrease in the bonding strength in the vicinity of the bonded interface due to thermal stress generated during cooling operation after bonding at high temperatures and without causing generation of cracks in the member weak against the thermal stress during the cooling operation with maintaining an appropriate bonding strength between the different members by using as a base a hard solder which is not restricted by the kind of the members or shape of the members and which leaves room for selection of bonding shape and by adding to the hard solder a fine particle material which lowers the thermal stress. Thus, the above patent application was filed.

As a method for bonding with the above composition, the patent application discloses a method which comprises disposing two or more different members differing in thermal stress so that they are opposed with a space enough to bond them, and pouring the composition into the space or filling a given amount of ceramic or cermet fine particles and subsequently pouring a given amount of the hard solder in molten state, followed by cooling to produce a composite member. However, the composition cannot be used as it is for bonding the members without a sufficient space provided therebetween to be able to pour a given amount of the hard solder.

In the case of bonding two or more different members which must be bonded through a fitting structure, especially, in the case of bonding the members with selecting a very narrow clearance of about 0.01–0.30 mm, various troubles often occur unless a solder is filled also on the side of the members as uniformly as possible. On the other hand, when the clearance is greater than the above upper limit, cracks sometimes occur due to the residual stress which is generated due to non-uniform filling of the solder in the clearance and is contained in the solder at the time of melting of the solder. This will be more specifically explained.

For example, when a member having a columnar dented portion and a member having a columnar protruded portion are fitted, if the solder to be uniformly filled in the columnar clearance formed by these members is one-sidedly filled on only one side because the clearance has a room to some extent, the balance of thermal shrinkage stress is lost in the process of cooling and solidifying the solder and the member having the columnar protruded portion is pulled to one direction, resulting in residual stress and cracks. Moreover, there are demands for dimensional accuracy and beautiful appearance of the composite member as a finished product. Thus, since it is substantially impossible to pour a given amount of a hard solder from a narrow clearance in the members having only such a narrow clearance, these different members cannot be bonded by the above method. The term "clearance" here means a width of the space present between the wall surfaces of the different members in the fitting structure.

Under the circumstances, in an attempt to solve these problems, the inventors have found that a member having a dented portion which forms a fitting structure and a member having a protruded portion which forms a fitting structure and being different from the member having the dented portion can be bonded by fitting them to each other in the following manner.

A fine particle material is uniformly spread over the surface of the dented portion of the member having the dented portion, then a platy or powdery hard solder is disposed so as to cover at least a part of the layer comprising the fine particle material, further the member having the protruded portion is disposed, these are heated to a given temperature under application of pressure to melt the hard solder. This molten hard solder is penetrated into the layer comprising the fine particle material to form a bonding layer of an adhesive composition controlled in expansion coefficient and comprising the hard solder and the fine particle material, or a fine particle material is uniformly spread over the surface of the dented portion of the member having the dented portion. Then the member having the protruded portion having one or a plurality of holes in which a hard solder is inserted is disposed so as to closely contact with the layer comprising the fine particle material. These are heated to a given temperature under application of pressure to melt the hard solder, and this molten hard solder is penetrated into the layer comprising the fine particle material to form a bonding layer of an adhesive composition controlled in expansion coefficient and comprising the hard solder and the fine particle material.

An alternative is a member having a protruded portion at the end of which is formed a layer comprising a hard solder and a fine particle material is previously prepared, only a hard solder is disposed on the surface of a dented portion of a member having the dented portion, the member having the protruded portion at the end of which is formed a layer comprising the hard solder and the fine particle material is disposed on the hard solder disposed on the surface of the dented portion of the member, these are heated to a given temperature under application of pressure to melt the layer comprising the hard solder and the particulate material formed at the end of the member having the protruded portion and the hard solder disposed on the surface of the dented portion of the member having the dented portion, thereby to form a bonding layer of an adhesive composition controlled in expansion coefficient and comprising the hard solder and the fine particle material. Based on this finding, Japanese Patent Application No. 11-180902 was filed on Jun. 25, 1999.

Furthermore, the Japanese Patent Application No. 11-180902 filed on Jun. 25, 1999 proposes a composite member having improved thermal cycle characteristics and comprising two or more different members obtained by the above fitting and bonding method, characterized by comprising at least a member having a dented portion which forms a fitting structure and a member having a protruded portion which forms a fitting structure and being different from the member having the dented portion, said different members being fitted and bonded to each other with an adhesive composition controlled in expansion coefficient and comprising a fine particle material and a hard solder.

However, the dispersing material dispersed in the hard solder is subjected to plating with Ni in order to ensure wetting with the hard solder. The solder layer, which is a composite formed by this method, has a lower expansion coefficient than the hard solder, which is a metallic material, and is effective in inhibiting breakage of the ceramic, which is a material to be bonded, and in improving the thermal cycle characteristics of the bonded part. But when strength of the ceramic (which is the material to be bonded) is low, for example, in the case of aluminum nitride or the like, it is difficult to completely inhibit the breakage. And with increase of the area of the bonded part, the possibility of the occurrence of breakage further increases, and, besides, there is a problem that if the number of the bonded parts in one product is great, the percent defective of the products cannot be ignored. For the inhibition of breakage of the materials to be bonded, in addition to reduction of expansion coefficient of the solder, reduction of Young's modulus and reduction of proof stress value are effective, but it has been found that positively advantageous operation for all of these physical characteristics is difficult using only these methods.

SUMMARY OF THE INVENTION

The object of the present invention is to provide an adhesive composition for bonding two or more different members which can give a bonded material excellent in heat resistance and other characteristics which inhibit breakage of the materials to be bonded by controlling the characteristics of the above-mentioned composite solder, namely, reducing the expansion coefficient, reducing the Young's modulus and the proof stress value. A method for bonding two or more different members using the adhesive composition, and a composite member comprising two or more different members bonded by the above method is also provided.

As a result of intensive research conducted by the inventors for attaining the above object, it has been found that the above object can be attained by an adhesive composition for bonding two or more different members which comprises a hard solder and a mixture of two or more fine particle materials differing in wettability with the hard solder. As a result, the present invention has been accomplished.

Moreover, it has been found that a bonded material of a composite member comprising different members bonded through a fitting structure which is inhibited from breaking and excellent in heat resistance characteristics and others can be produced by using an adhesive composition controlled in expansion coefficient, Young's modulus and proof stress value by the above-mentioned method. Thus, the present invention of the second aspect has been accomplished.

Furthermore, it has been found that a composite member excellent in heat resistance characteristic and others which comprises a member having a dented portion which forms a fitting structure and a member having a protruded portion which forms a fitting structure and being different from the member having the dented portion, the different members being fitted and bonded to each other with a bonding layer comprising a hard solder and a mixture of two or more fine particle materials differing in wettability with the hard solder, can be obtained without causing breakage by using the adhesive composition controlled in expansion coefficient, Young's modulus and proof stress value. Thus, the present invention of the third aspect has been accomplished.

DESCRIPTION OF THE INVENTION

Figure 1:
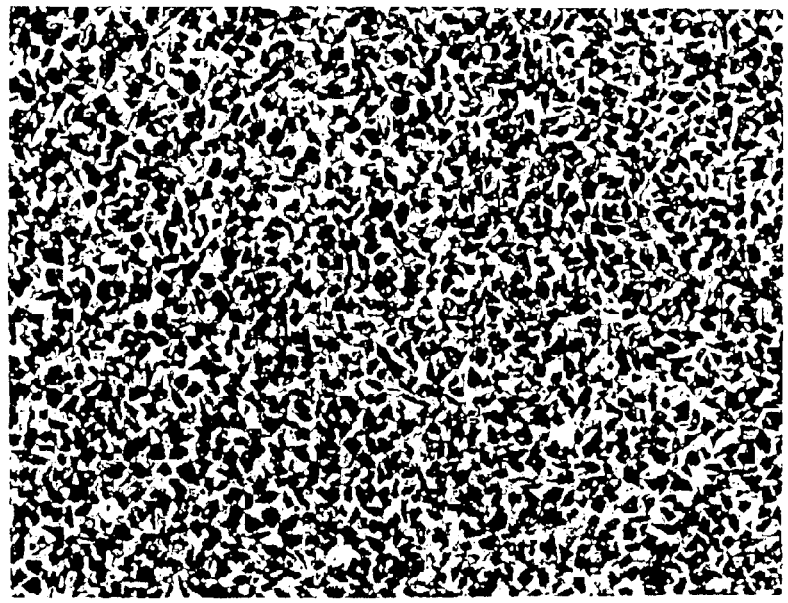
FIG. 1 is an optical microphotograph which shows the microstructure of an adhesive prepared using only the fine particle material subjected to plating treatment.

The first aspect of the present invention relates to an adhesive composition for bonding two or more different members which comprises a hard solder and a mixture of two or more fine particle materials differing in wettability with the hard solder. In this adhesive composition, the base metal constituting the hard solder is Au, Ag, Cu, Pd, Al or Ni, and the mixture of two or more fine particle materials differing in wettability with the hard solder is preferably a mixture of ceramic fine particles, cermet fine particles or low-expansion metal fine particles which are not surface treated and ceramic fine particles, cermet fine particles or low-expansion metal fine particles which are surface treated. In the mixture of two or more fine particle materials differing in wettability with the hard solder, the mixing ratio of the fine particle material which is not surface treated and the fine particle material which is surface treated is preferably 5:95–80:20. The term "materials differing in wettability with the hard solder" means a combination of a material superior in relative wettability with the hard solder and a material inferior in relative wettability with the hard solder.

Examples of the combination of a material superior in relative wettability with the hard solder and a material inferior in relative wettability with the hard solder are a combination of ceramic fine particles subjected to surface treatment such as plating and ceramic fine particles subjected to no surface treatment, a combination of low-expansion metal fine particles subjected to surface treatment such as plating or subjected to no surface treatment and ceramic fine particles subjected to no surface treatment, and other combinations. The plating method here is not limited, but electroless plating is suitable.

Furthermore, without carrying out the metal plating treatment, wettability with the hard solder can be ensured by incorporating additives, such as Ti in the form of fine particles, into the solder, or by adding the fine particle material to form a reactive layer of active materials such as a nitride, an oxide, a carbide and the like on the surface of the ceramic. In this case, if those differing in wettability with the hard solder containing the additive are combined, the above-mentioned effect can be exhibited. For example, when the combination of the dispersing materials is nitride and oxide or nitride and carbide, the effect can be satisfactorily exhibited. The amount of the active materials is suitably about 0.5–5% in weight ratio based on the amount of hard solder.

That is, the fine particle materials comprising two or more materials differing in wettability with the hard solder can be easily prepared, for example, by mixing alumina particles of a desired particle size, (for example, alumina particles 50 $\mu$m in average particle diameter) which are subjected to Ni plating of about 0.5 $\mu$m as the particles subjected to surface treatment in a desired thickness with alumina particles of a desired particle size, (for example, 50 $\mu$m in average particle diameter) as the particles subjected to no surface treatment. The fine particle materials comprising two or more materials differing in wettability with the hard solder containing a given amount of Ti or the like as the additive can be easily prepared by mixing aluminum nitride of a desired particle size, (for example, 50 $\mu$m in average particle diameter) with alumina particles of a desired particle size, (for example, 50 $\mu$m in average particle diameter).

The mixing ratio of the fine particle material subjected to no surface treatment to the fine particle material subjected to surface treatment is more preferably in a range of 1:9, (namely, the fine particle material subjected to no surface treatment occupies about 10% of all particles), to 3:1, (namely, the fine particle material subjected to no surface treatment occupies about 75% of all particles). Further preferably, the mixing ratio is in a range of about 1:3–1:1.

If the mixing ratio of the material subjected to no surface treatment is increased to more than 3:1, the action and effect as an adhesive is considerably lowered, and this is not preferred. In obtaining the adhesive composition of the present invention, the hard solder to be penetrated and the penetration method and conditions can be in accordance with the disclosure of Japanese Patent Application No. 11-180902. Moreover, the fine particle material subjected to the surface treatment for ensuring the wettability and the fine particle material subjected to no surface treatment can be the same materials, as long as the fine particle material subjected to the surface treatment for ensuring the wettability and the fine particle material subjected to no surface treatment for ensuring the wettability are combined. In other words, it is a matter of course that the same materials different in only whether they are subjected to or not subjected to the plating treatment may be used.

The hard solders used for the adhesive compositions in the present invention include, for example, solders containing as a base a metal such as Au, Ag, Cu, Pd, Al or Ni. Of course, those which are more suitable can be used depending on wettability between the members to be bonded and the solders, reactivity between the members to be bonded or dispersion particles and the solders, or temperature conditions of using the solders. In the case of bonded members being used at an environmental temperature of 500° C. or lower, Al-based solders such as BA4004 (Al-10Si-1.5 Mg) may be suitably used. In the case of the bonded members being used at an environmental temperature of 500° C. or higher, Au, BAu-4(Au-18Ni), BAg-8(Ag-28Cu) and the like may be suitably used.

By using the adhesive composition of the present invention, a bonded material having excellent heat resistance characteristics and others while inhibiting breakage of the materials to be bonded can be obtained by positively partly reducing the interface bonding force between the hard solder and the dispersing material dispersed in the hard solder, or by positively forming fine voids in the adhesive composition, to thereby reduce the Young's modulus and proof stress value in addition to reducing the expansion coefficient. More specifically, this effect can be attained by using a mixture of particles having superior wettability with respect to the hard solder and particles inferior in wettability with the hard solder as a material to be dispersed in the hard solder. As suitable combinations of the particles superior in wettability with the hard solder and the particles inferior in wettability with the hard solder, combinations of particles subjected to the surface treatment such as plating for ensuring wettability with the hard solder and the particles subjected to no such surface treatment may be used, such as a nitride and an oxide, low-expansion metal particles and an oxide, and the like.

When the proportion of the particles superior in wettability with the hard solder is great, the optically observed microstructure of the adhesive composition does not substantially differ from that of the adhesive composition prepared using only the particles subjected to the surface treatment. While the reduction of the expansion coefficient and the reduction of Young's modulus is equal to those of the adhesive composition prepared using only the particles superior in wettability are attained, the effect of the reduction in proof stress value is higher than that of the adhesive composition prepared using only the particles subjected to the surface treatment. It is considered that this is because the interfacial bonding force between the particles inferior in wettability and the hard solder is reduced as compared with that between the particles superior in wettability and the hard solder, and, as a result, the characteristics of the adhesive composition are controlled.

Moreover, when the proportion of the particles inferior wettability with the hard solder is increased, optically observable voids are formed in the adhesive composition. As a result, in addition to the reduction of expansion coefficient being equal to that of the adhesive composition prepared using only the particles superior in wettability, greater reductions of Young's modulus and proof stress value can be attained as compared with those of the composition having a smaller amount of the particles inferior in wettability with the hard solder. It is understood that this is because in the composition having a larger amount of particles inferior in wettability with the hard solder, in addition to reducing the interfacial bonding force between the dispersing material and the hard solder, the apparent sectional area of the composition decreases due to the presence of the voids formed, and, as a result, Young's modulus is reduced. Additionally, the proof stress value is reduced because the portion near the void becomes a crack forming point upon loading.

In explanation of the mechanism to develop the effect exhibited by the adhesive composition of the present invention, for convenience' sake, the action and the effect have been explained according to the amount of the particles subjected to no surface treatment for ensuring the wettability such as plating treatment, but the purpose, the preparation method, the action and the effect are the same and the necessity to severely specify the boundary is small. However, it may become necessary in considering the sealability of the adhesive composition at the bonded portion.

In order to efficiently reduce the thermal stress, it is necessary to adjust the kind of fine particle material and packing density thereof in the hard solder, and, for this purpose, it is necessary to adjust the thermal expansion coefficient of the adhesive composition layer. As the fine particle materials which reduce the thermal stress, those having a smaller expansion coefficient are more advantageous for reducing the thermal expansion coefficient of the adhesive composition layer. The packing density of the fine particle material for the hard solder is 30–90%, preferably 40–70% by volume. In the case of dispersing the particles superior in wettability with the hard solder and the particles inferior in wettability with the hard solder, the ratio by volume of the particles calculated on the assumption that there are no voids in the adhesive composition is also 30–90%, preferably 40–70%. In these cases, increasing the packing density of the fine particle material is advantageous for reducing the expansion coefficient, but too high packing density is not preferred because deterioration of bonding strength is sometimes caused. If the packing density is lower, sometimes the desired expansion coefficient cannot be obtained, and care should be taken in this respect. That is, adjustment of the expansion coefficient can be attained by selecting the kind of the fine particle material so as to be able to attain the desired expansion coefficient or by suitably selecting the particle size distribution of the fine particle material.

The second aspect of the present invention relates to a method for producing a composite member comprising different members by fitting and bonding a member having a dented portion which forms a fitting structure and a member having a protruded portion which forms a fitting structure and being different from the member having the dented portion. The method includes the following steps: a step of uniformly spreading a mixture of at least two fine particle materials differing in wettability with the hard solder over the surface of the dented portion of the member having the dented portion, then disposing a platy or powdery hard solder so as to cover at least a part of the layer comprising the mixture of at least two fine particle materials differing in wettability with the hard solder, and further disposing the member having the protruded portion. Alternatively, the method includes a step of uniformly spreading a mixture of at least two fine particle materials differing in wettability with a hard solder over the surface of the dented portion of the member having the dented portion and disposing the member having the protruded portion having one or a plurality of holes in which a hard solder is inserted so as to closely contact with the layer comprising the fine particle materials; or previously preparing a member having a protruded portion at the end of which is formed a layer comprising a hard solder and a mixture of at least two fine particle materials differing in wettability with the hard solder, disposing a hard solder on the surface of a dented portion of a member having the dented portion and disposing thereon the member having the protruded portion having the layer, and a step of heating them to a given temperature under application of pressure to melt the hard solder and impregnating the mixture of at least two fine particle materials differing in wettability with the hard solder with said molten hard solder to form a bonding layer comprising the hard solder and the fine particle materials, thereby to bond the different members through the fitting structure.

Figure 5:
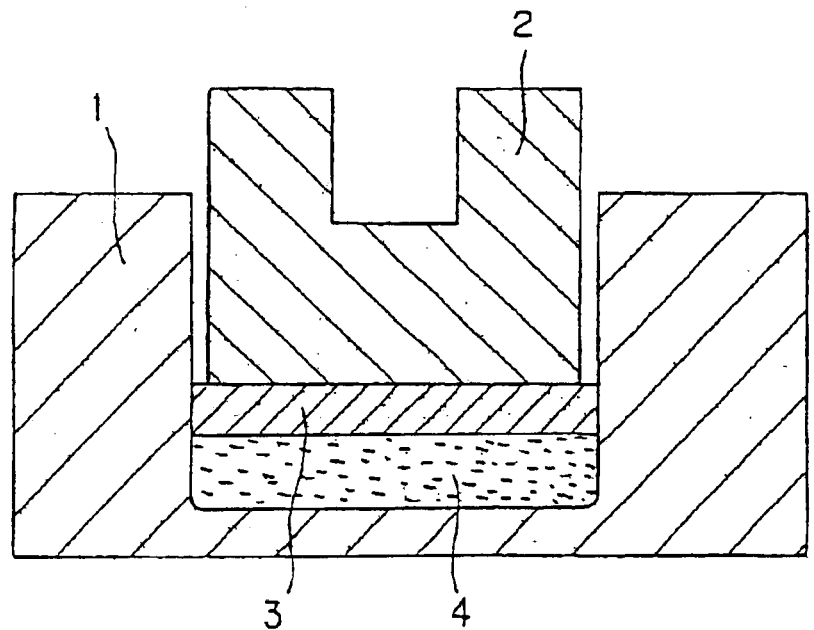
FIG. 5 is a cross-sectional view of a bonded structure formed according to one embodiment of the present invention.

The first embodiment of the bonding method according to the second aspect of the present invention, shown in FIG. 5, is a method for bonding different members through a fitting structure which comprises uniformly spreading a mixture (4) of at least two fine particle materials differing in wettability with the hard solder over the surface of a dented portion of a member (1) having the dented portion, then disposing a platy or powdery hard solder (3) so as to cover at least a part of the layer comprising the mixture of at least two fine particle materials differing in wettability with the hard solder, further disposing a member (2) having a protruded portion, heating them to a given temperature under application of pressure to melt the hard solder and impregnate the fine particle materials with this molten hard solder to form a bonding layer of an adhesive composition comprising the hard solder and the fine particle materials. In this case, a mixture of the fine particle materials with the powdery hard solder may be used in place of the layer comprising the fine particle materials and the platy or powdery hard solder which covers said layer.

The second embodiment is a method for bonding different members through a fitting structure which comprises uniformly spreading a mixture (4) of at least two fine particle materials differing in wettability with the hard solder over the surface of a dented portion of a member (1) having the dented portion, disposing the member (2) having the protruded portion having one or a plurality of holes in which a hard solder (3) is inserted so that the member (2) closely contacts with the layer comprising the fine particle materials, heating them to a given temperature under application of pressure to melt the hard solder and impregnate the mixture of at least two fine particle materials differing in wettability with the hard solder with this molten hard solder to form a bonding layer of an adhesive composition comprising the hard solder and the fine particle materials.

Figure 6:
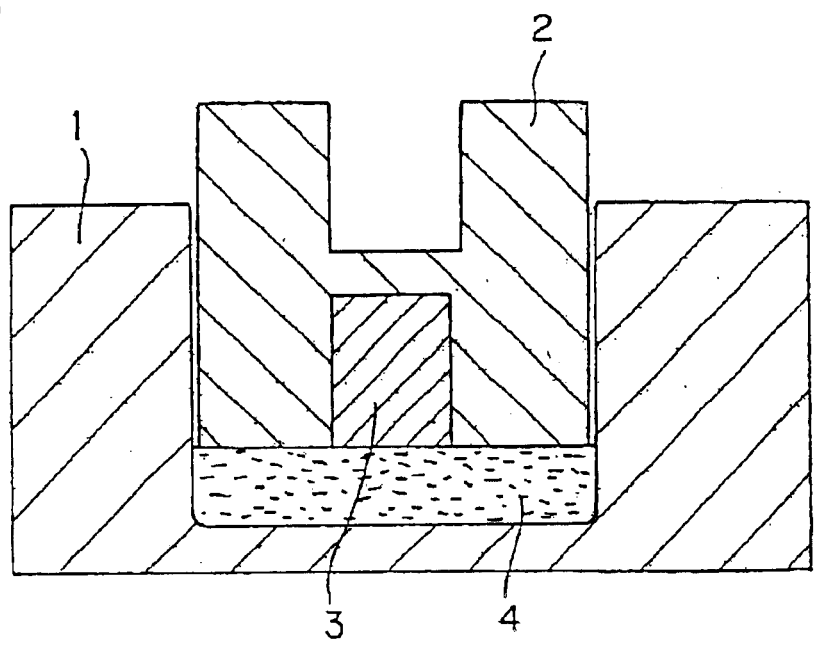
FIG. 6 is a cross-sectional view of a bonded structure formed according to another embodiment of the present invention.

The third embodiment is a method for bonding different members through a fitting structure, shown in FIG. 6, which comprises previously preparing a member (2) having a protruded portion in the end of which is formed a hard solder (3) and a mixture (4) of at least two fine particle materials differing in wettability with the hard solder is disposed in a dented portion of a member (1), disposing thereon said member having the protruded portion having said layer, heating them to a given temperature under application of pressure to melt the layer which comprises the hard solder and the mixture of at least two fine particle materials differing in wettability with the hard solder and which is formed at the end of the member having the protruded portion and the hard solder which is disposed on the surface of the dented portion of the member having the dented portion, thereby to form a bonding layer comprising the hard solder and the fine particle materials.

Conditions employed for bonding other than those mentioned above, for example, disposing method of the materials, melting conditions including melting temperature and others, cooling conditions and the like can be in accordance with the disclosures of Japanese Patent Application No. 10-52971 filed on Feb. 18, 1998 and Japanese Patent Application No. 11-180902 filed on Jun. 25, 1999.

As examples of combination of the two or more different members used in the present invention, mention may be made of combinations of ceramics members such as of aluminum nitride and silicon nitride with metallic members such as of molybdenum, Kovar and tungsten, or combinations of different ceramics members differing in the starting materials. More specific examples are composite members obtained by fitting and bonding aluminum nitride members which are used in production of semiconductor wafers and exhibit electrostatic chuck function or heater function by metal electrodes or metal electrical heating elements incorporated therein with metallic molybdenum members bonded as terminals for supplying electricity to the incorporated metal electrodes or the like.

As a third aspect of the present invention, a composite member comprising at least two different members in which a member having a dented portion which forms a fitting structure and a member having a protruded portion which forms a fitting structure and being different from the member having the dented portion are fitted with each other and bonded with a bonding layer of an adhesive composition comprising a hard solder and a mixture of at least two fine particle materials differing in wettability with the hard solder, can be produced by the above-mentioned method. A clearance formed in the fitting structure portion between the wall surface of the member having a dented portion and the wall surface of the member having a protruded portion can usually range from about 0.01–0.3 mm, preferably about 0.02–0.07 mm. If the clearance is less than the above lower limit, there is the possibility that the members cannot be fitted, and if it is more than the upper limit, there is the possibility that the solder is one-sidedly filled as mentioned above.

The present invention will be explained by the following examples, which never limit the present invention. Evaluation of bonding state and thermal cycle resistance was conducted by judging whether deterioration of tensile strength of the bonded portion occurred after being exposed to the thermal cycle atmosphere. In this case, when the strength deteriorated at least 25% than before being exposed to the thermal cycling atmosphere, the sample was judged to be bad. For reference, whether cracking or peeling at the bonded portion occurred was also examined by observing a section of the bonding layer.

EXAMPLE 1

Figure 2:
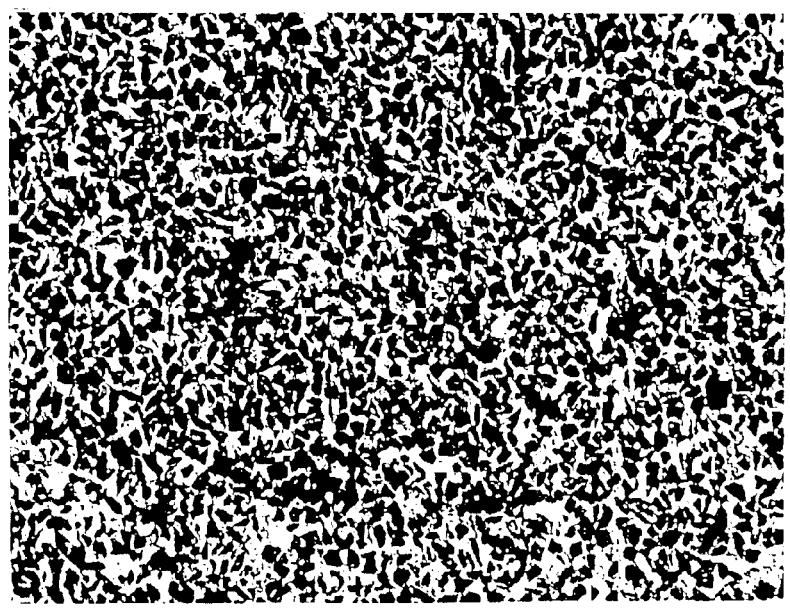
FIG. 2 is an optical microphotograph which shows the microstructure of an adhesive prepared using the fine particle material subjected to no plating treatment and the fine particle material subjected to plating treatment at a ratio of 1:3.
Figure 3:
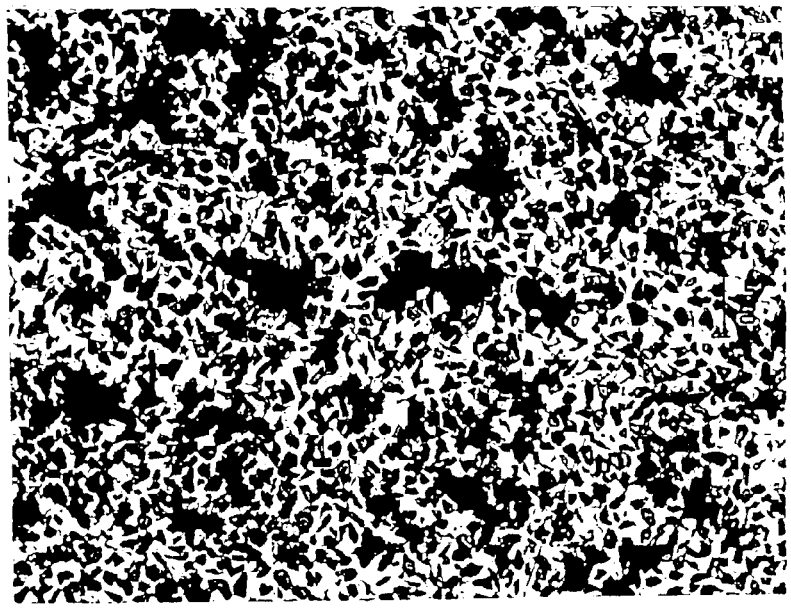
FIG. 3 is an optical microphotograph which shows the microstructure of an adhesive prepared using the fine particle material subjected to no plating treatment and the fine particle material subjected to plating treatment at a ratio of 1:2.
Figure 4:
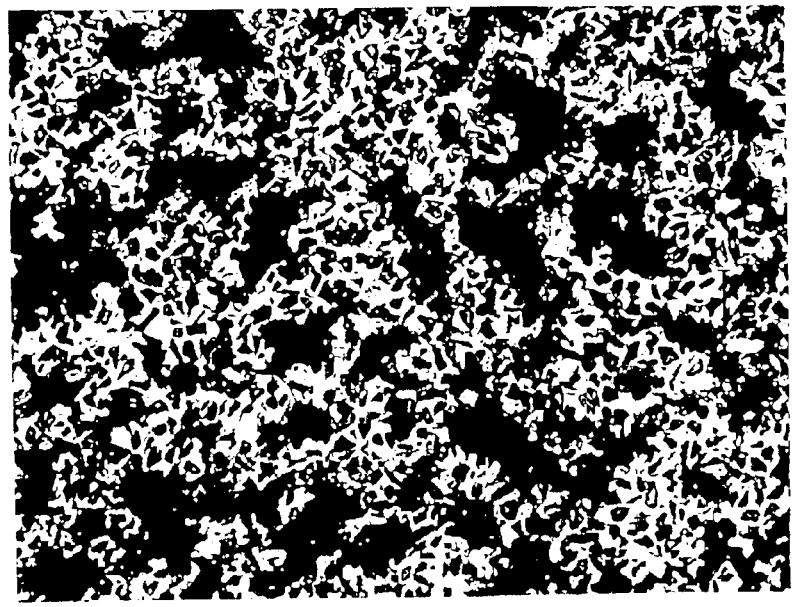
FIG. 4 is an optical microphotograph which shows the microstructure of an adhesive prepared using the fine particle material subjected to no plating treatment and the fine particle material subjected to plating treatment at a ratio of 1:1.

Dispersing particles comprising a mixture of alumina of 50 $\mu$m in average particle size, the surface of which was plated with Ni at a thickness of about 0.3 $\mu$m, and alumina of 50 $\mu$m in average particle size subjected to no surface treatment at a mixing ratio of 1:0, 3:1, 2:1, 1.5:1, 1:1 or 1:3 were impregnated with a hard solder A5005 (Al-0.8 Mg) under application of a given pressure, followed by coagulation to obtain an adhesive composition. A sample was prepared from the adhesive composition, and mechanical physical properties of the sample were measured and the results are shown in Table 1. Optical microphotographs of microstructures of the representative samples are shown in FIGS. 2–4. FIG. 1 is an optical microphotograph showing microstructure of a sample which was prepared by using a fine particle material comprising only alumina of 50 $\mu$m in average particle size subjected to Ni plating as a comparative example.

TABLE 1

Mechanical physical properties of adhesive compositions

| Thickness of plating (μm) | Amount of plated particles (%) | Expansion coefficient ($10^{-6}$) | Young's modulus (GPa) | Proportional limit (MPa) | Note |
|---|---|---|---|---|---|
| 0.3 | 100 | 13.4 | 103 | 70 | |
| 0.3 | 75 | 13.5 | 101 | 65 | |
| 0.3 | 67 | 13.2 | 95 | 63 | |
| 0.3 | 60 | 13.1 | 75 | 52 | |
| 0.3 | 50 | 13.5 | 57 | 45 | |
| 0.3 | 25 | — | — | — | Difficulty in stable bonding |

EXAMPLE 2

Dispersing particles comprising a mixture of alumina of 50 μm in average particle size, the surface of which was plated with Ni at a thickness of about 1 μm, and alumina of 50 μm in average particle size subjected to no surface treatment at a mixing ratio of 1:0, 3:1, 2:1, 1.5:1, 1:1 or 1:3 were impregnated with a hard solder A5005 (Al-0.8 Mg) under application of a given pressure, followed by coagulation to obtain an adhesive composition. A sample was prepared from the adhesive composition, and mechanical physical properties of the sample were measured and the results are shown in Table 2.

TABLE 2

Mechanical physical properties of adhesive compositions

| Thickness of plating (μm) | Amount of plated particles (%) | Expansion coefficient ($10^{-6}$) | Young's modulus (GPa) | Proportional limit (MPa) | Note |
|---|---|---|---|---|---|
| 1.0 | 100 | 13.1 | 135 | 103 | |
| 1.0 | 75 | 13.5 | 129 | 91 | |
| 1.0 | 67 | 12.8 | 102 | 83 | |
| 1.0 | 60 | 13.3 | 90 | 62 | |
| 1.0 | 50 | 12.2 | 70 | 47 | |
| 1.0 | 25 | 13.0 | 59 | 25 | |

EXAMPLE 3

As a member having a dented portion which forms a fitting structure, an aluminum nitride member having a thickness of 10.0 mm and having a vertically bored hole of 5.07 mm in diameter and 9.5 mm in depth used for fitting, and as a member having a protruded portion which forms a fitting structure and being different from the member having a dented portion, a columnar metallic molybdenum member of 5.0 mm in diameter and a length of 15.0 mm were bonded in the following manner.

As dispersing particles, a mixture comprising alumina of 50 μm in average particle size, the surface of which was plated with Ni at a thickness of about 0.3 μm, and alumina of 50 μm in average particle size subjected to no surface treatment at a mixing ratio of 1:0, 2:1 or 1:1 was uniformly spread over the surface of the dented portion of the aluminum nitride member plated with Ni at a thickness of about 0.5 μm. The thickness of the dispersing particle layer was 0.8 mm. A hard solder A5005 (Al-0.8 Mg) disposed so as to cover the dispersing particles was molten during heating and penetrated into the layer comprising the fine particle material to form a composite bonding layer. Thus, two kinds of samples were prepared in which bonding was performed with a composite bonding layer comprising a hard solder and a mixture of at least two fine particle materials differing in wettability with the hard solder, and one kind of sample in which bonding was performed with a composite bonding layer comprising a hard solder and a fine particle material comprising only alumina of 50 μm in average particle size subjected to Ni plating as a comparative example. The thickness of the composite bonding layer formed was 0.8 mm.

The resulting bonded members were subjected to a thermal cycle test. The thermal cycle test was conducted by repeating 50 times the cycle which comprised heating the bonded member from 60° C. to 180° C. at a heating rate of 2.5° C./min, immediately after reaching 180° C., cooling the bonded member to 60° C. at a cooling rate of –2.5° C./min and immediately after reaching 60° C., repeating this cycle. The degree of occurrence of cracks in aluminum nitride after the thermal cycle test is shown in Table 3. Moreover, the results of bond strength tests between the molybdenum terminal and aluminum nitride before and after being subjected to the thermal cycle test are shown in Table 4.

TABLE 3

Inhibition effect of breakage of the bonded member

| Amount of plated particles (%) | Expansion coefficient ($10^{-6}$) | Young's modulus (GPa) | Proportional limit (MPa) | Effect of inhibition of breakage (No. of broken samples/No. of samples) |
|---|---|---|---|---|
| 100 | 13.1 | 135 | 103 | |
| 75 | 13.5 | 129 | 91 | |
| 67 | 12.8 | 102 | 83 | |

TABLE 4

Bond strength of bonded members

| Example or Comparative Example | Amount of plated particles (%) | Strength as Bonded (MPa) | Strength after thermal cycle test (MPa) | Ratio of strength before and after thermal cycle test (%) |
|---|---|---|---|---|
| Com. Exam. 1 | 100 | 4723 | 4969 | 103 |
| Com. Exam. 2 | 100 | 5069 | 4794 | 100 |
| Com. Exam. 3 | 100 | 4639 | 4549 | 95 |
| Exam. 1-1 | 67 | 4768 | 4490 | 94 |
| Exam. 1-2 | 67 | 4330 | 4930 | 101 |
| Exam. 1-3 | 67 | 4530 | 4750 | 100 |
| Exam. 2-1 | 50 | 4930 | 4380 | 92 |
| Exam. 2-2 | 50 | 4944 | 5120 | 110 |
| Exam. 2-3 | 50 | 4730 | 4530 | 97 |

* Ratio (%) of the strength before and after the thermal cycle test is shown as a ratio of the strength (MPa) after the thermal cycle test to the average value of the strength (MPa) (n = 3) as bonded in all of the comparative examples and Examples 1 and 2.

As is clear from the results of tests shown in the above Table 1 and microphotographs of microstructures of the accompanying FIGS. 2–4, in the case of the adhesive compositions for bonding according to the present invention, since the bonding force between the dispersing material and the hard solder is partially controlled or fine voids are introduced into the microstructure, the portions controlled in the bonding force or the voids introduced act as breakage starting points. As a result, breakage can be effectively avoided also when forces, such as thermal stress, are applied as shown in the above Table 3. As shown in Table 1, in the case of the adhesive compositions for bonding according to the present invention, the reduction of Young's modulus and the reduction of proof stress value are recognized, but the thermal expansion coefficient is substantially the same as the composition using only the fine particle material subjected to plating treatment. As a result, there are no differences in strength of the bonded body as bonded and heat resistance of the bonded body as shown in Table 4. This is a noticeable point.

By using the adhesive compositions for bonding according to the present invention, even when the strength of the ceramic member, such as aluminum nitride, is low, a bonded body having excellent heat resistance characteristics and the like can be obtained while inhibiting breakage of the member to be bonded by carrying out control of the characteristics of the composite solder, namely, a reduction of Young's modulus and a reduction of proof stress value in addition to a reduction of expansion coefficient. Moreover, according to the bonding method using the adhesive composition for bonding of the present invention, breakage which may occur in the members to be bonded or failure of bonding can be avoided by reducing the stress remaining between the members to be bonded, and a composite member comprising different members which is high in reliability can be produced. Thus, a composite member comprising different members which is high in reliability can be provided.

What is claimed is:

1. A method for producing a composite member comprising different members by fitting and bonding a member having a dented portion which forms a fitting structure and a member having a protruded portion which forms a fitting structure and being different from the member having the dented portion, said method comprising the following steps:

a step of uniformly spreading a mixture of at least two fine particle materials differing in wettability with a hard solder over the surface of the dented portion of the member having the dented portion, then disposing a platy or powdery hard solder so as to cover at least a part of the layer comprising the fine particle materials, and further disposing the member having the protruded portion; or uniformly spreading a mixture of at least two fine particle materials differing in wettability with a hard solder over the surface of the dented portion of the member having the dented portion and disposing the member having the protruded portion having one or a plurality of holes in which a hard solder is inserted so as to closely contact with the layer comprising the mixture of at least two fine particle materials differing in wettability with the hard solder; or previously preparing a member having a protruded portion at the end of which is formed a layer comprising a hard solder and a mixture of at least two fine particle materials differing in wettability with the hard solder, disposing a hard solder on the surface of a dented portion of a member having the dented portion and disposing thereon said member having the protruded portion having the layer, and a step of heating them to a given temperature under application of pressure to melt the hard solder and impregnating the mixture of at least two fine particle materials differing in wettability with the hard solder with said molten hard solder to form a bonding layer comprising the hard solder and the fine particle materials, thereby to bond the different members through the fitting structure.

2. A method according to claim 1, wherein the step of disposing the member having the protruded portion comprises uniformly spreading a mixture of at least two fine particle materials differing in wettability with a hard solder over the surface of the dented portion of the member having the dented portion, then disposing a platy or powdery hard solder so as to cover at least a part of the layer comprising the mixture of at least two fine particle materials differing in wettability with a hard solder, and further disposing the member having the protruded portion.

3. A method according to claim 1, wherein the step of disposing the member having the protruded portion comprises uniformly spreading a mixture of at least two fine particle materials differing in wettability with a hard solder over the surface of the dented portion of the member having the dented portion and disposing the member having the protruded portion having one or a plurality of holes in which a hard solder is inserted so as to closely contact with the layer comprising a mixture of at least two fine particle materials differing in wettability with the hard solder.

4. A method according to claim 1, wherein the step of disposing the member having the protruded portion comprises previously preparing a member having a protruded portion at the end of which is formed a layer comprising a hard solder and a mixture of at least two fine particle materials differing in wettability with the hard solder, disposing a hard solder on the surface of a dented portion of a member having the dented portion and disposing thereon the member having the protruded portion having the layer.

5. A method according to claim 1, wherein at least one of the different members is a ceramic member.

6. A method according to claim 1, wherein one of the different members is a ceramic member and another is a metal member.

7. A method according to claim 1, wherein the fine particles are a fine particle material which reduces thermal stress.

8. A method according to claim 2, wherein the fine particles are a fine particle material which reduces thermal stress.

9. A method according to claim 3, wherein the fine particles are a fine particle material which reduces thermal stress.

10. A method according to claim 4, wherein the fine particles are a fine particle material which reduces thermal stress.

11. A method according to claim 1, wherein a base metal of the hard solder is Au, Ag, Cu, Pd, Al or Ni, and the mixture of two or more fine particle materials differing in wettability with the hard solder is a mixture of ceramic fine particles, cermet fine particles or low-expansion metal fine particles which are not surface treated and ceramic fine particles, cermet fine particles or low-expansion metal fine particles which are surface treated.

12. A method according to claim 2, wherein a base metal of the hard solder is Au, Ag, Cu, Pd, Al or Ni, and the mixture of two or more fine particle materials differing in wettability with the hard solder is a mixture of ceramic fine particles, cermet fine particles or low-expansion metal fine particles which are not surface treated and ceramic fine particles, cermet fine particles or low-expansion metal fine particles which are surface treated.

13. A method according to claim 3, wherein a base metal of the hard solder is Au, Ag, Cu, Pd, Al or Ni, and the mixture of two or more fine particle materials differing in wettability with the hard solder is a mixture of ceramic fine particles, cermet fine particles or low-expansion metal fine particles which are not surface treated and ceramic fine particles, cermet fine particles or low-expansion metal fine particles which are surface treated.

14. A method according to claim 4, wherein a base metal of the hard solder is Au, Ag, Cu, Pd, Al or Ni, and the mixture of two or more fine particle materials differing in wettability with the hard solder is a mixture of ceramic fine particles, cermet fine particles or low-expansion metal fine particles which are not surface treated and ceramic fine particles, cermet fine particles or low-expansion metal fine particles which are surface treated.

15. A method according to claim 11, wherein the ceramic fine particles, cermet fine particles or low-expansion metal fine particles which are surface treated are fine particles covered with a metal by plating or sputtering.

16. A method according to claim 12, wherein the ceramic fine particles, cermet fine particles or low-expansion metal fine particles which are surface treated are fine particles covered with a metal by plating or sputtering.

17. A method according to claim 13, wherein the ceramic fine particles, cermet fine particles or low-expansion metal fine particles which are surface treated are fine particles covered with a metal by plating or sputtering.

18. A method according to claim 14, wherein the ceramic fine particles, cermet fine particles or low-expansion metal fine particles which are surface treated are fine particles covered with a metal by plating or sputtering.

* * * * *